UNITED STATES PATENT OFFICE.

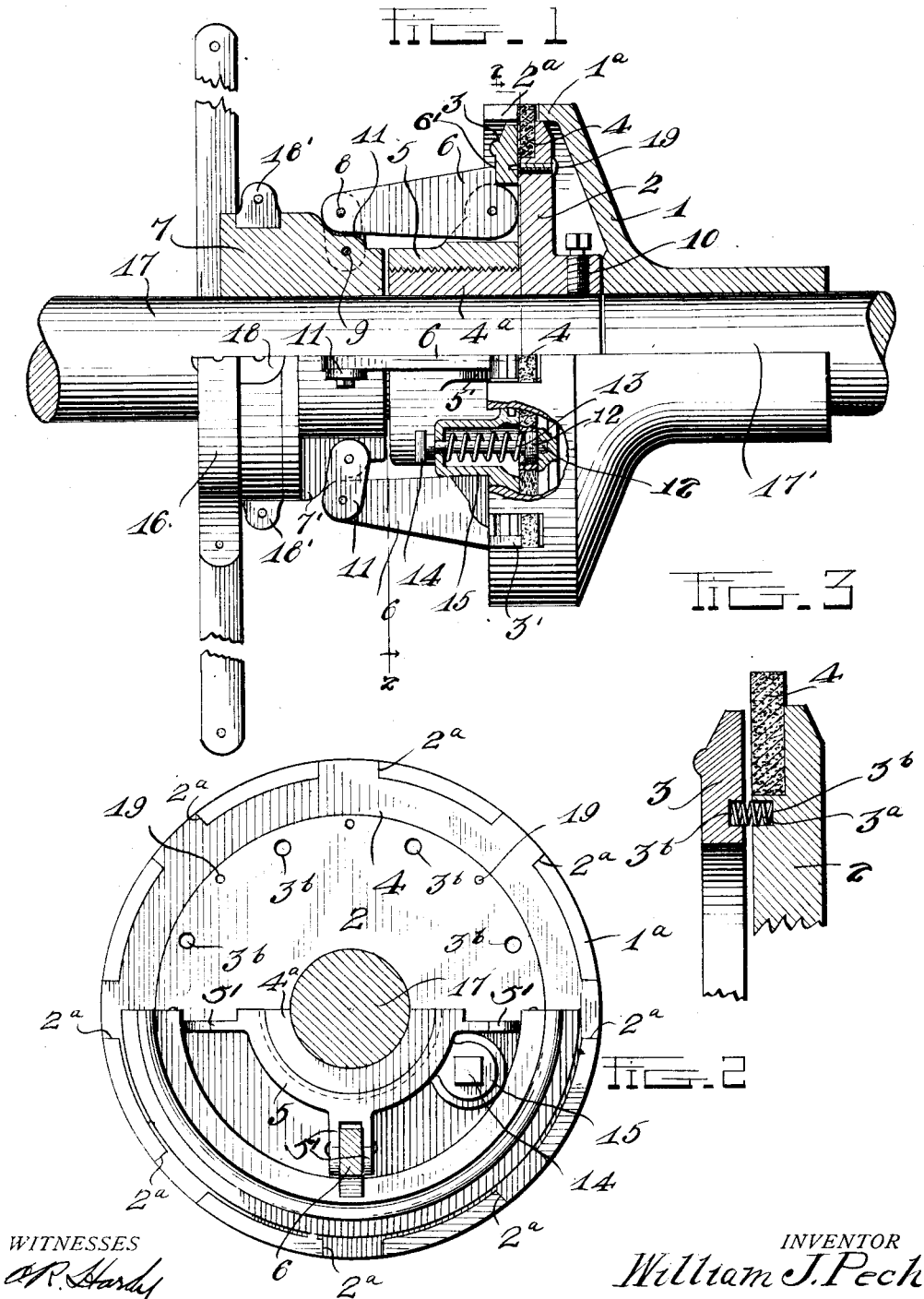

WILLIAM J. PECH, OF ALGONA, IOWA.

FRICTION-CLUTCH.

1,071,083.   Specification of Letters Patent.   Patented Aug. 26, 1913.

Application filed January 18, 1912. Serial No. 671,980.

*To all whom it may concern:*

Be it known that I, WILLIAM J. PECH, a citizen of the United States, residing at Algona, in the county of Kossuth and State of Iowa, have invented certain new and useful Improvements in Friction-Clutches, of which the following is a specification, reference being had therein to the accompanying drawing.

This invention relates to clutches and has for its object the production of an efficient and durable clutch which may be readily and quickly operated.

Another object of this invention is the production of an efficient means for throwing the clutch gripping band into an operative position.

Still another object of this invention is the production of an efficient gripping means whereby the gripping lever and supporting collar will be firmly held in a locked position against independent rotation.

With these and other objects in view this invention consists of certain novel constructions, combinations, and arrangements of parts as will be hereinafter fully described and claimed.

In the drawings Figure 1 is a side elevation of the clutch partly in section. Fig. 2 is a transverse section taken on line 2—2 of Fig. 1. Fig. 3 is an enlarged fragmentary section showing the means for spacing the friction plate away from the stationary clutch frame.

Referring to the drawings by numerals 1 designates the primary clutch frame which is carried by the section 17' of the shaft, and the end of this shaft 17' is placed adjacent the end of the shaft 17. The primary clutch frame 1 is provided with a sleeve portion as illustrated in Fig. 1 of the drawing, and is also provided with a clutch plate engaging portion 1ª which is provided with a plurality of apertures 2ª through which extend the projecting fingers of the friction disk 4. This friction disk 4 is supported within the recess 3' of the auxiliary clutch frame 2. This auxiliary clutch frame 2 is keyed to the shaft 17' by means of a locking bolt 10. A plurality of pins 19 are carried by the plate 2, and these pins engage at their outer end a friction plate 3 for holding the friction plate 3 against rotation independently of the plate 2. This friction plate 3 is spaced from the main frame 2 by means of coil springs 3ª which coil springs are placed in the sockets 3ᵇ formed in the plate 3, and frame 2. It will, therefore, be obvious that the frame 2 may be independently rotated without rotating the disk 4 when the plate 3 is spaced therefrom.

The frame 2 is provided with a laterally extending threaded collar portion 4ª upon which is threaded the clutch arm supporting collar 5. This collar 5 carries a plurality of ears 5' within which ears are pivotally mounted the clutch levers 6. These clutch levers 6 are provided with a friction plate engaging shoulder 6', and this shoulder is adapted to engage the plate 3 for throwing the same into engagement with the disk 4 when so desired. Of course, a plurality of these levers 6 are employed for throwing the plate 3 into engagement with the disk 4.

A loose sliding collar 7 is carried by the shaft 17 and is provided with the usual yoke 18 for shifting the collar 7 relative to the shaft 17. This yoke 18 is shifted by means of the usual shifting lever 16. Links 11 are carried by the flanges 7' of the collar 7 and engage the inner ends of the levers 6 for allowing the operation of the collar relative to the levers 6. The yoke 18, of course, comprises the usual sections being held together through the medium of binding bolts passing through the flanges 18' formed thereon.

A casing 15 is carried by the collar 5 and within this casing 15 is positioned a plunger 14 having a head 12. This head 12 is adapted to fit in sockets formed upon the inner face of the frame 2, and this head is normally held within the sockets by means of the spring 13. Of course, the plunger 14 may be drawn out of the sockets formed in the frame 2 when it is so desired to merely grip the head of the plunger 14 and pulling the same outwardly.

From the foregoing description it will be obvious that a very efficient and durable clutch means has been produced whereby the same may be immediately thrown into operation.

It will be further obvious that a very efficient structure has been produced through the medium of the bolt 14 whereby the collar 5 will be locked against independent rotation relative to the frame 2. This collar 5 is so held upon the frame 2 as to prevent the collar 5 from unthreading from the frame as above stated. Of course, the slots 2ª formed in the primary frame 1 extend to the outer face of the frame 1, so as to allow the frame 1 to be easily removed therefrom when so desired.

What is claimed is:—

A clutch of the character described comprising a plurality of shafts, a primary frame carried by one shaft, an auxiliary frame carried by the other shaft, said primary frame having a plurality of notches formed therein, a friction disk carried by said primary frame and provided with means engaging said notches for locking the same in engagement with said primary frame, means carried by said auxiliary frame for gripping said friction disk for locking said frame in engagement therewith, a collar carried by said auxiliary frame, a casing mounted upon said collar, a spring plunger mounted in said casing, said auxiliary frame being provided with a socket formed therein for receiving the inner end of said plunger, and said plunger adapted to hold said collar against independent rotation with reference to said auxiliary frame.

In testimony whereof I hereunto affix my signature in presence of two witnesses.

WILLIAM J. PECH.

Witnesses:
  JOHN LAMUTH,
  R. W. PETTIT.